June 23, 1936.  H. C. BUFFINGTON  2,044,933
SCRAPER OR GRADER
Filed June 2, 1933  5 Sheets-Sheet 1
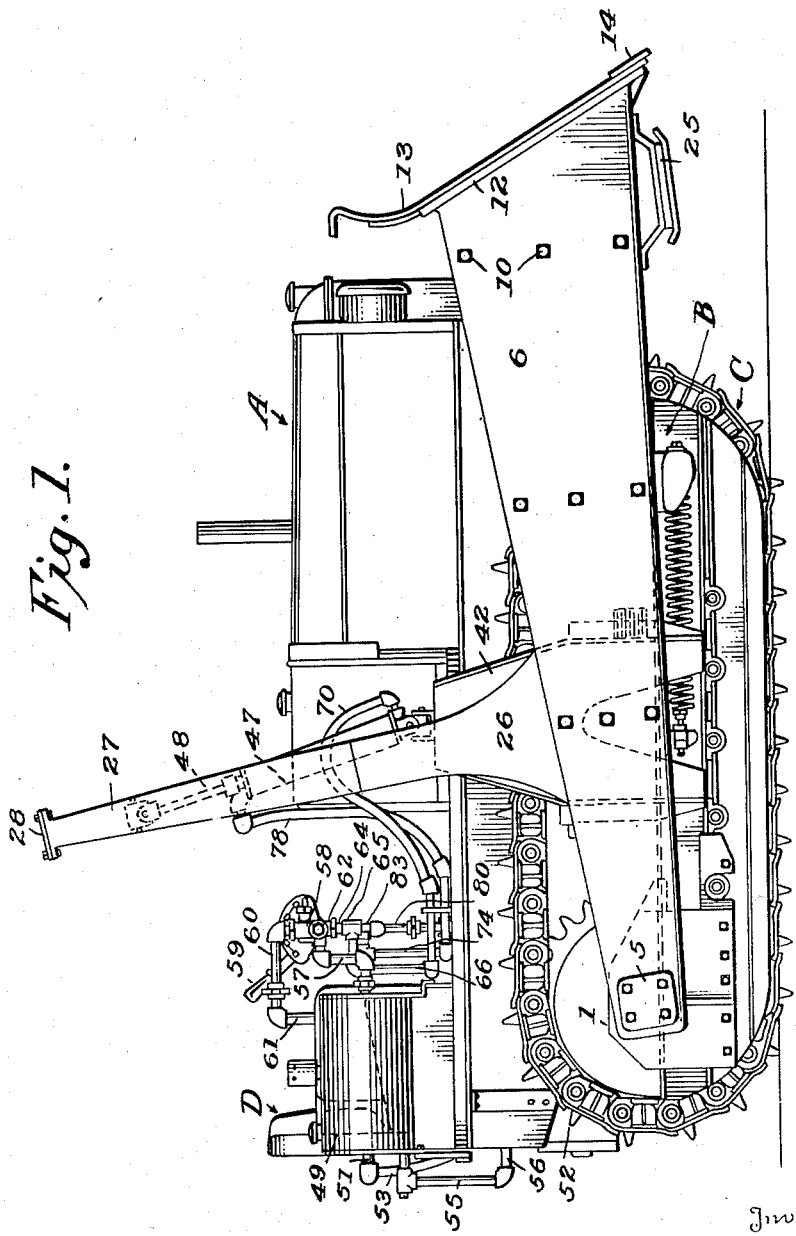
Inventor
Harry C. Buffington.
By Milans & Milans
Attorneys June 23, 1936.  H. C. BUFFINGTON  2,044,933
SCRAPER OR GRADER
Filed June 2, 1933    5 Sheets-Sheet 2
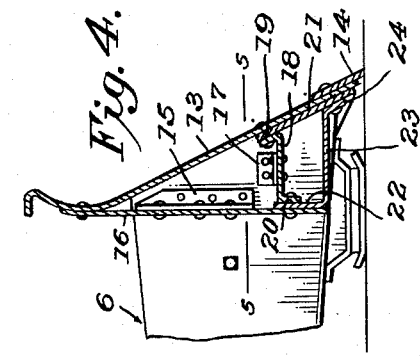
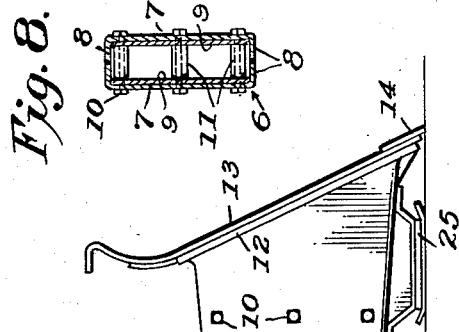
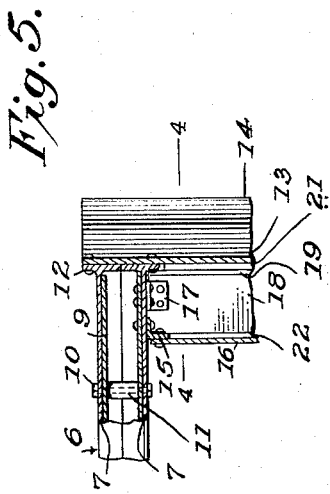
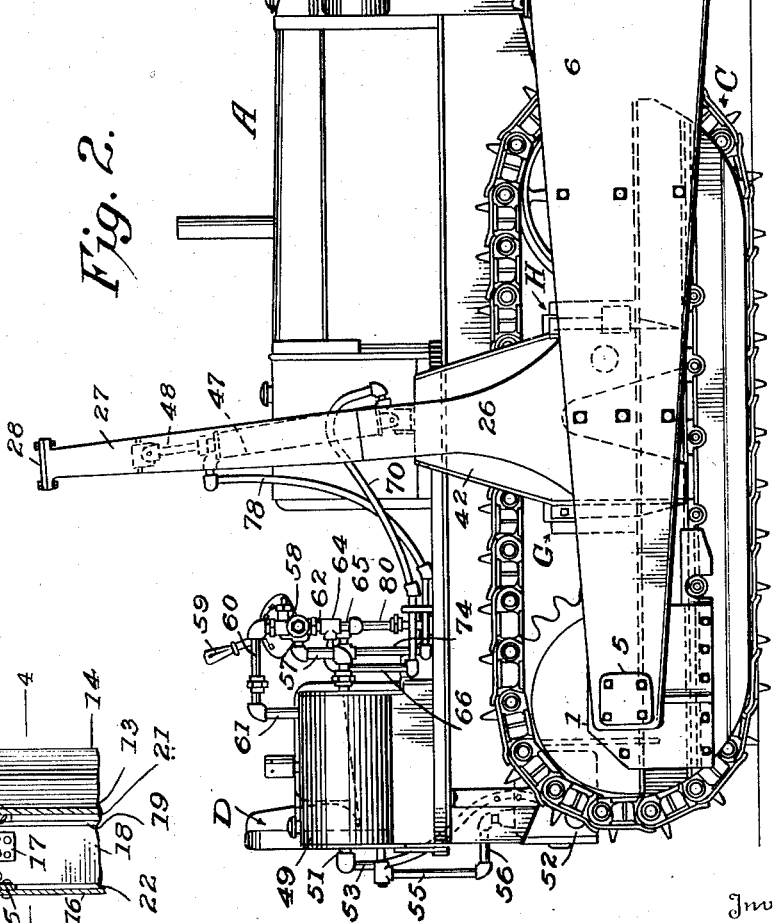
Inventor
Harry C. Buffington.
By Milans & Milans
Attorneys

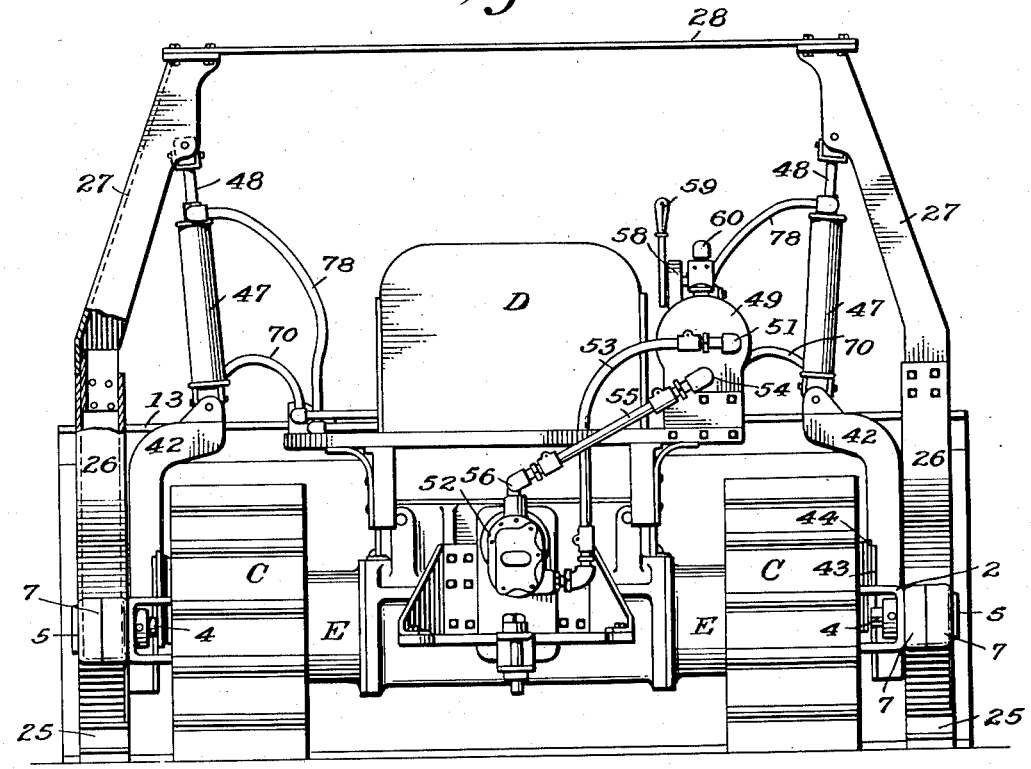
Fig. 3.
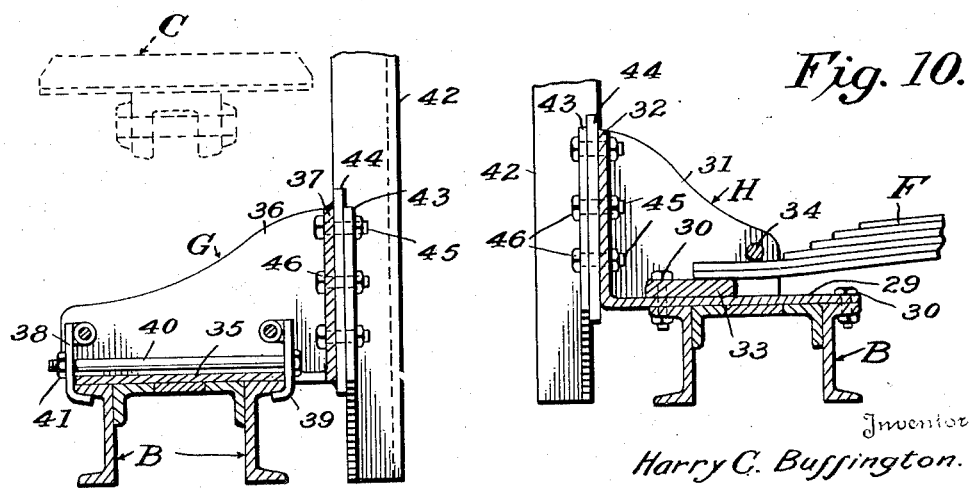
Fig. 10.
Fig. 9.
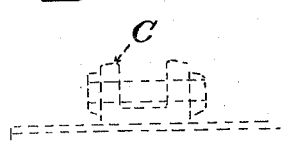

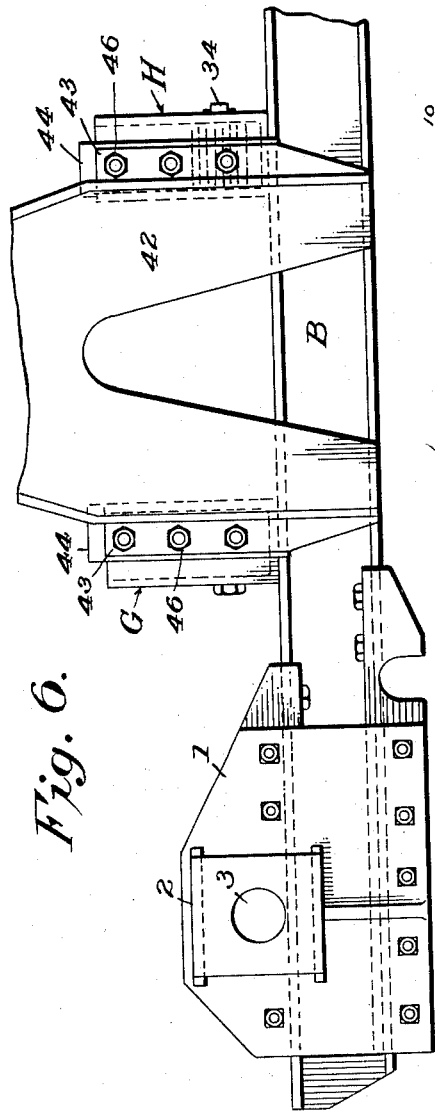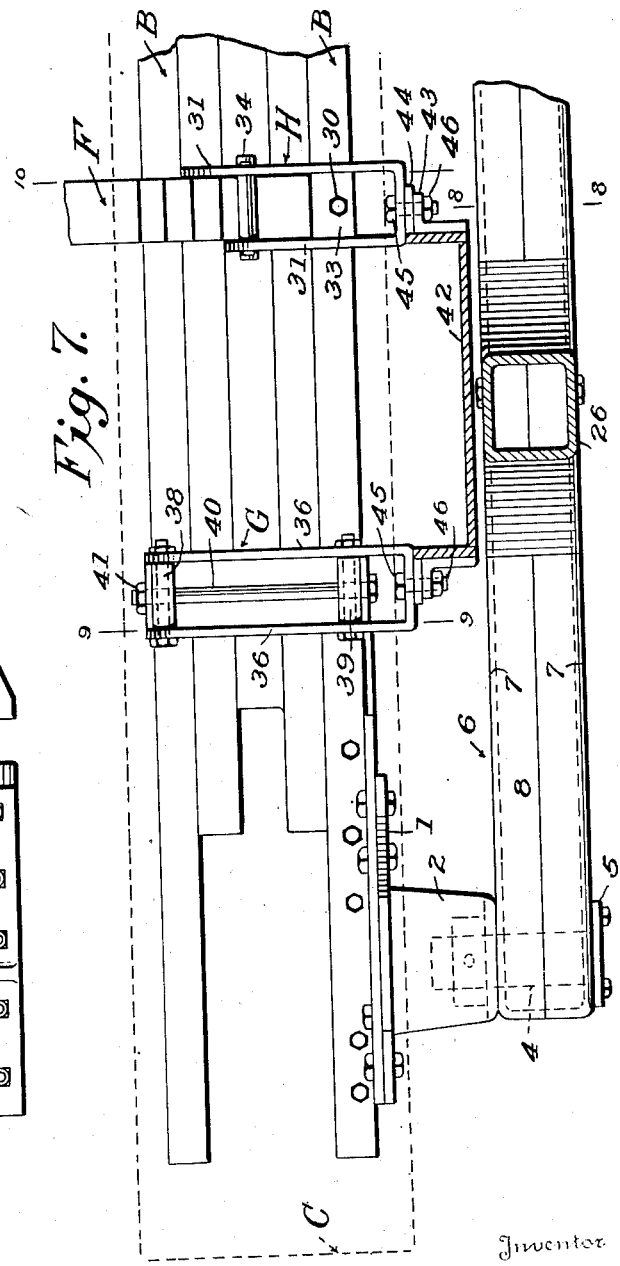

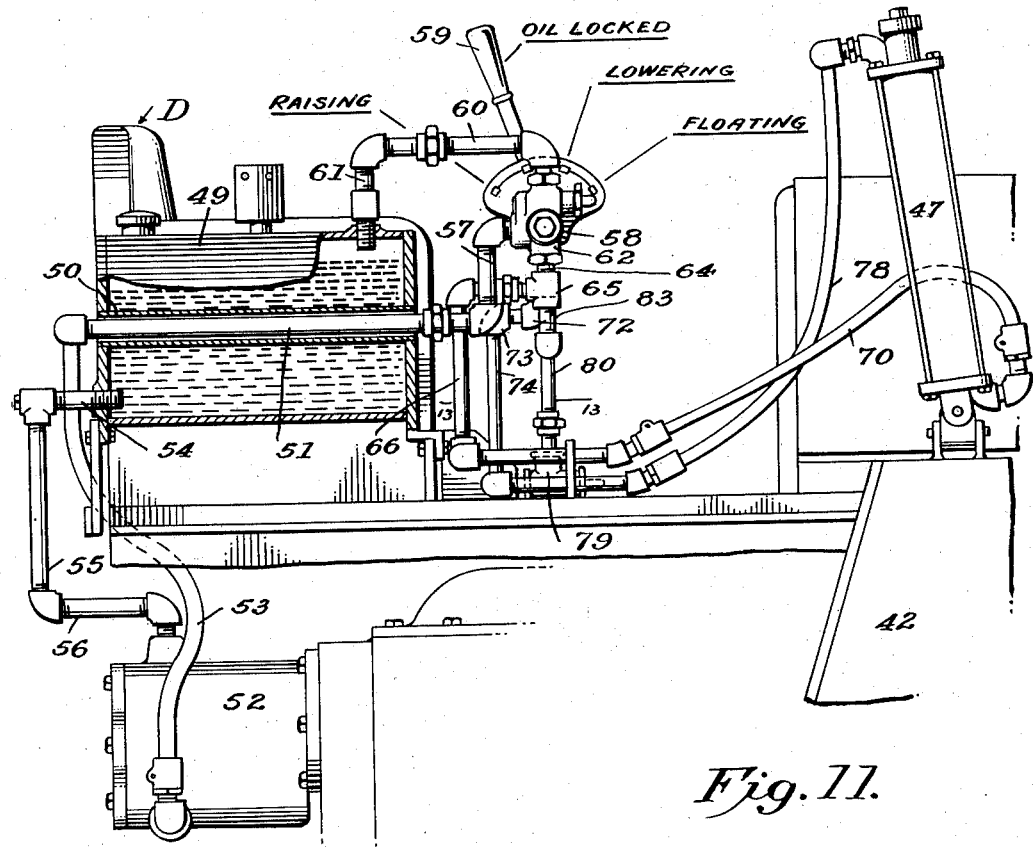
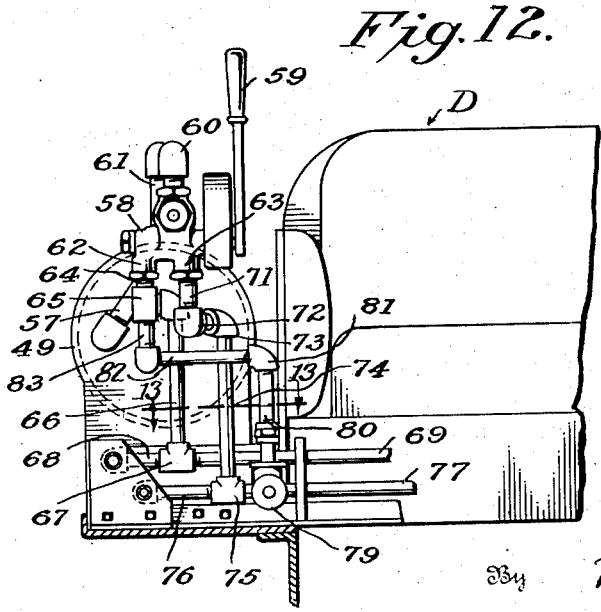
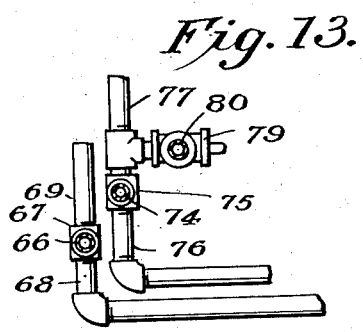

Patented June 23, 1936

2,044,933

UNITED STATES PATENT OFFICE 2,044,933

SCRAPER OR GRADER

Harry C. Buffington, Springfield, Ill., assignor to The Baker Manufacturing Company, Springfield, Ill., a corporation of Illinois Application June 2, 1933, Serial No. 674,111

REISSUED

16 Claims. (Cl. 37—144)

My invention relates to new and useful improvements in scrapers or graders and to what has become generally known in the art as a bulldozer, the principal object of the invention residing in the provision of novel means for mounting the bulldozer on a tractor of the well-known crawler or endless track type and for raising and lowering the same into inoperative or operative position.

Another object of the invention consists in the provision of means whereby the scraping blade or mold board blade of the bulldozer is always kept in perfect alignment with the ground line when the tractor is going over uneven ground.

A further object resides in so connecting the bulldozer to the tractor that the weight thereof is equally distributed on both tracks of the tractor.

Still another object of the invention consists in the provision of hydraulic means for raising and lowering the bulldozer, such hydraulic means permitting, when desired, the scraping blade or mold board blade to be forced into tight contact with the ground and held in such position against raising movement during the operation of the tractor, or when desired permitting what might be termed a floating action of the blade or in other words permitting the blade to raise and lower due to unevenness in the ground.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a side elevation showing the bulldozer mounted on a tractor and in raised position.

Fig. 2 is a view similar to Fig. 1 showing the bulldozer in lowered position.

Fig. 3 is a rear elevation.

Fig. 4 is a fragmental sectional detail taken on the line 4—4 of Fig. 5.

Fig. 5 is a fragmental sectional detail taken on the line 5—5 of Fig. 4.

Fig. 6 is a fragmental detail showing in side elevation the pivotal mounting for the bulldozer and the brackets secured to the track frame, for mounting the cylinder of the raising and lowering mechanism.

Fig. 7 is a fragmental top plan of the construction shown in Fig. 6 with a portion of the push beam shown in top plan and pivotally connected to the bulldozer mounting.

Fig. 8 is a transverse section on the line 8—8 of Fig. 7.

Fig. 9 is a transverse section on the line 9—9 of Fig. 7.

Fig. 10 is a transverse section on the line 10—10 of Fig. 7.

Fig. 11 is a fragmental side elevation, with parts in longitudinal section, showing the tank for containing the oil used in the mechanism for raising and lowering the bulldozer, the pump for circulating the oil, one of the lowering and elevating cylinders, the connecting mechanism for conveying the oil to the lowering and elevating cylinder, and the valve for controlling the oil circulation and the operating lever therefor.

Fig. 12 is a fragmental detail showing an end view of the oil tank, the pipe and valve connections, and control lever for the valve; and Fig. 13 is a section on the line 13—13 of Fig. 12.

In the drawings A denotes a tractor of the crawler or endless track type including the track frames B and endless tracks C of usual well-known construction and as the driving mechanism for the endless tracks, nor the mountings therefor, form no particular part of the present invention a detailed description thereof is not thought necessary. At D I have illustrated a seat for the operator and it will be understood that the control levers for the operation of the tractor will be within easy reach as will also the control lever or handle for operating the valve of the raising and lowering mechanism for the bulldozer. The track frames are pivotally mounted, adjacent their rear ends on the axle E in the usual well-known manner and at the forward ends are connected to a transversely extending spring F as is the custom in tractors of the type illustrated. With this construction the forward ends of the track frames and tracks may raise and lower while going over uneven ground and one track frame and its associated track may swing on its pivot independent of the other.

My improved form of bulldozer, which is carried by the tractor, includes the brackets 1 which are secured to the outer faces of the tracks B, each of these brackets including a forwardly directed portion indicated at 2 and provided with an opening 3 to receive the pivot pin 4 carried by the plate 5. Pivotally connected to the brackets 1 by the pins 4 are the side push beams 6 which are of hollow formation as shown more particularly in Fig. 8 of the drawings, these push beams being formed of the side plates 7 each of which has along its longitudinal edges an inwardly directed flange 8, the meeting edges of the flanges being welded as shown more particularly in Fig. 8 of the drawings to form a substantially rigid construction. Secured to the inner face of each of the plates 7 is a reinforcing plate 9 and extending through the plates 7 and 9 are the bolts 10 on which are mounted the sleeves 11 which hold the side plates 7 against inward movement and which reinforce the push beam constructions. At their forward ends the push beams are provided with the outwardly directed flanges 12 and to which is secured a scraping blade or mold board 13 having along its lower edge a knife like edge portion 14 as shown more particularly in Fig. 4 of the drawings. Secured to the inner face of each of the push beams 6 is an angle iron strip or bracket 15 to which brackets is secured a plate 16 which extends transversely between the push beams 6. Also secured to the inner face of each of the push beams 6 is an angle iron bracket 17 and secured to these angle iron brackets is a transversely extending plate 18 as also shown more particularly in Figs. 4 and 5 of the drawings. The plate 18 has the upwardly directed flange 19 and the downwardly directed flange 20, the upwardly directed flange 19 being secured to the blade or mold board 13 by means of rivets or other suitable fastenings and positioned between the inner face of the blade or mold board and the upturned flange 19 is a reinforcing plate 21. The downwardly directed flange 20 of the plate 18 is secured to the plate 16 by means of rivets or other suitable fastenings and positioned between the face of the plate 16 and the outer face of the downwardly directed flange 20 is an upwardly directed flange 22 of a transversely extending plate 23 which in turn has a downwardly directed flange 24 secured to the plate 21 and blade or mold board 13 by means of rivets or other suitable fastenings, these rivets also securing in position the knife like cutting edge 14. From the above detailed description it will be noted that the push beams themselves are of strong construction and that the scraping blade or mold board 13 is secured to the push beams and reinforced so as to provide for the necessary strength while in use.

Secured to the bottom edge of each of the push beams 6, and just to the rear of the scraping blade or mold board is a runner 25 which is adapted to be engaged with the ground when the bulldozer is lowered into operative position.

Extending upwardly from the upper edge of each of the push beams 6, intermediate the ends thereof, is a standard 26 which is of hollow formation as shown more particularly in Fig. 3 of the drawings and the upper end of which is opened to receive the lower end of a post 27, these posts 27 extending inwardly at an angle, as shown more particularly in Fig. 3 of the drawings, and being connected at their upper ends by the transversely extending plate or strip 28.

Secured to each of the track frames B and longitudinally spaced thereon are the brackets G and H the brackets H, as shown more particularly in Figs. 7 and 10 of the drawings, including a base plate 29, secured to the track frame by means of the nuts and bolts indicated generally at 30, the upwardly extending side plates 31 and the front plate 32. A block 33 is secured to the base plate 29 by one of the bolts 30 and associated nut as shown more particularly in Fig. 10 of the drawings and extending transversely between the side plates 31 is a bolt 34. The ends of the spring F engage the upper face of the blocks 33 and are positioned beneath the bolts 34, as shown more particularly in Fig. 10 of the drawings. Each of the brackets G includes a base plate 35, upwardly extending side plates 36 and front plate 37. Pivotally mounted between the side plates 36 are the clamps 38 and 39 which engage the upper flanges of the track frame B as shown more particularly in Fig. 9 of the drawings and these clamp plates are drawn inwardly or into clamping engagement by means of the bolt 40 and nut 41. Secured to each pair of brackets G and H and extending upwardly therefrom is a standard 42 which has an outwardly directed flange 43 struck from each vertical edge and positioned between those flanges and the outer faces 32 and 37 of the brackets G and H respectively are the plates 44. Bolts 45 extend through the front faces 32 and 37 of the brackets G and H, through the flanges 43 and plates 44, and receive the nuts 46. By this arrangement it will be seen that the standards 42 are secured to the brackets G and H, that the brackets H form ready means for connecting the ends of the transverse spring F to the track frames B and that through means of the clamps 38 and 39 the brackets G may be easily secured in position and adjusted as desired.

Pivotally connected to the upper edge or surface of each of the standards 42, by means of a universal joint is one end of a cylinder 47 and positioned and operable in each of the cylinders 47 is a piston having a piston rod 48, the ends of the piston rods being pivotally connected to the posts 27 by means of universal joints as shown more particularly in Fig. 3 of the drawings. It will thus be seen that the cylinders are connected to the standards 42 which are connected in turn to the track frames B while the pistons are connected to the post 27 which in turn are connected to the push beams of the bulldozer.

Oil is adapted to be fed or forced into opposite ends of the cylinders 47 and on opposite sides of the pistons operable therein. This oil is normally stored within the tank 49 which has extending therethrough a tube 50 forming a passage for the pipe 51 which has one end connected to a pump 52 through means of the pipe 53. Leading from one end of the tank 49, and communicating therewith, is a pipe 54 which in turn is connected to the pump 52 through means of the pipe 55 and branch 56. The pump 52 is operated from the tractor, in the usual well-known manner, and draws the oil from the tank 49 through the pipes 54 and 55 and branch 56 and forces it through the pipes 53 and 51 into and through the pipe 57 into a valve casing indicated generally at 58 and in which is positioned a valve which is operable through means of the handle or lever 59 for controlling the movement of the oil in the various directions and through the various pipes desired. Oil is conveyed back from the valve casing 58 into the tank 49 through the pipe 60 and branch 61. The valve casing 58 is provided with the downwardly extending nipples or outlets 62 and 63. Leading from the nipple or outlet 62 is a short pipe section 64 connected to the T-coupling 65 and connected to and leading from this T-coupling is a downwardly extending pipe 66 with its lower end connected to and communicating with the T-coupling 67 from opposite sides of which lead the pipe sections 68 and 69 to the outer ends of which are connected the flexible piping 70 leading into the lower ends of the cylinders 47. When the valve within the casing 58 is set to allow passage of the oil to the nipple or outlet 62 the oil is forced through the pipe 66 and branches 68 and 69 into and through the flexible piping 70 into the lower ends of the cylinders 47 to thereby raise the pistons operable in these cylinders and to in turn raise the bulldozer into the position shown more particularly in Fig. 1 of the drawings. Leading from the nipple or outlet 63 is a pipe section 71 to the lower end of which is connected by means of the couplings 72 and 73 a pipe 74 having its lower end connected to and communicating with the T-coupling 75 from opposite sides of which extend the pipe sections 76 and 77 which are in turn connected to and communicate with the flexible tubing or piping 78 leading into and communicating with the upper ends of the cylinders 47. Within the pipe section 77 is positioned a relief valve indicated generally at 79 and leading from this relief valve is a pipe 80 connected by means of the coupling 81 with the pipe section 82 which in turn is connected by the pipe 83 to the T-joint 65 connected to the outlet nipple 62 by the pipe section 64. When the valve within the casing 58 is said to communicate with the outlet nipple 63 oil will be conveyed through the pipes 71 and 74 to the coupling 75 and from this coupling through the pipes 76 and 77 and flexible connection 78 to the upper ends of the cylinders 47. The pressure of oil within the upper ends of the cylinders will force the pistons downwardly to lower the bulldozer into the position shown more particularly in Fig. 2 of the drawings with the lower or cutting edge of the scraping blade or mold board in contact with the ground. The relief valve 79 is provided to prevent breakage of parts should the pressure become too great in the lowering movement. If the pressure becomes too great the relief valve 79 is operated to permit passage of the oil through the pipes 80 and 82 and connecting pipe 83 to the F-coupling 65, it being noted that the oil may then pass through the T-coupling through the connections to the lower ends of the cylinders thus relieving pressure within the upper sides or ends of the cylinders. In Fig. 11 of the drawings I have denoted the various positions of the lever 59 which controls the valve within the casing 58.

From the above detailed description it is thought that the construction and operation will be clearly understood. It will be noted that I have provided novel means for connecting the bulldozer to the tractor as well as novel means for raising and lowering the same, these means distributing the weight of the bulldozer equally on both tracks of the tractor and permitting the mold board blade or scraping blade to be kept in perfect alignment with the ground line when the tracks are going over uneven ground. At the same time I wish to call particular attention to the fact that the cylinders 47 are positioned so that a straight line through the cylinders would extend to a point central to the tracks which operate over the ground. In Fig. 1 of the drawings I have illustrated the bulldozer as being in raised position with the scraping blade or mold board positioned a substantial distance above the ground line so that the tractor may be moved to the desired place of operation. To lower the bulldozer into the position shown in Fig. 2 of the drawings, or in other words into operative position, the lever 59 will be operated to position the valve within the casing 58 to convey oil under pressure through the various connections into the upper ends of the cylinders 47. The oil entering the upper ends of the cylinders 47 under pressure causes the pistons within the cylinders to move towards the lower ends of the cylinders thus through means of the piston rods 48 drawing downwardly on the posts 27 which are connected to the push beams 6. If the pressure within the cylinders should be too great, as the scraping blade or mold board engages the ground, the relief valve 79 will operate as previously described to remove pressure. When the bulldozer is in this lowered position the valve within the casing 58 may be set to permit flow of oil between the upper and lower ends of the cylinders 47 so that the bulldozer may "float" or in other words raise or lower according to unevenness in the ground or may be set to lock the oil against movement from the cylinders thereby locking the bulldozer in its lowered position. As previously stated in the description of the invention with the endless tracks, are pivotally mounted so that the forward ends of the frames and tracks may raise and lower when going over uneven ground although the forward ends are normally held in lowered position through means of the transversely extending spring F. It will be noted that one track frame and its associated track may raise or lower independently of the other and through means of the cylinder and piston connections with the bulldozer the track frames and associated tracks may swing on their pivots, in going over uneven ground, without affecting the position of the bulldozer. It can be seen that when one of the track frames and associated track is swung on its pivot the cylinder connected thereto may slide relative to its associated piston without affecting pressure on the piston to move the bulldozer. When going over uneven ground, as previously stated, the bulldozer will be permitted to float and will not be locked in permanent position. In other words the bulldozer will only be locked when the machine is being moved over even ground.

Having fully described my invention what I claim as new and desire to secure by Letters Patent is:—

1. A machine of the character described including in combination with a tractor having track frames, push beams pivotally connected to the track frames, a road implement carried by the push beams, members extending upwardly from the push beams, cylinders carried by the track frames, and pistons operable in the cylinders and connected to the upwardly extending members for raising and lowering the push beams and road implement carried thereby, the center line through the cylinders extending to a point central of the tracks.

2. A machine of the character described including in combination with a tractor having track frames, push beams pivotally connected to the track frames, a road implement carried by the push beams, members carried by the push beams and extending upwardly therefrom, members carried by the track frames and extending upwardly therefrom, and means interposed between the members carried by the track frames and the members carried by the push beams for raising and lowering the push beams and road implement carried thereby.

3. A machine of the character described including in combination with a tractor having track frames, push beams pivotally connected to the track frames, a road implement carried by the push beams, members carried by the push beams and extending upwardly therefrom, members carried by the track frames and extending upwardly therefrom, and cylinders and pistons interposed between the members carried by the track frames and the members carried by the push beams for raising and lowering the push beams and road implement carried thereby.

4. A machine of the character described including in combination with a tractor having track frames, push beams pivotally connected to the track frames, a road implement carried by the push beams, spaced brackets carried by the track frames, members carried by the brackets and extending upwardly therefrom, and means carried by the upwardly extending members for raising and lowering the push beams and road implement carried thereby.

5. A machine of the character described including in combination with a tractor having track frames and a transversely extending spring, push beams pivotally connected to the track frames, a road implement carried by the push beams, longitudinally spaced brackets connected to each of the track frames, one of said brackets connected to each of the track frames being formed and adapted to engage an end of the transversely extending spring, members carried by the brackets and extending upwardly therefrom, and means carried by the upwardly extending members for raising and lowering the push beams and road implement carried thereby.

6. A machine of the character described including in combination with a tractor having track frames and a transversely extending spring, push beams pivotally connected to the track frames, a road implement carried by the push beams, longitudinally spaced brackets connected to each of the track frames, one of said brackets connected to each of the track frames being formed and adapted to engage an end of the transversely extending spring and the other of said brackets being readily adjustable longitudinally of its track frame, members carried by the brackets and extending upwardly therefrom, and means carried by the upwardly extending members for raising and lowering the push beams and road implement carried thereby.

7. A machine of the character described including in combination with a tractor having track frames, push beams pivotally connected to the track frames, a road implement carried by the push beams, longitudinally spaced brackets connected to each of the track frames, one of said brackets being readily adjustable longitudinally of its track frame, members carried by the brackets and extending upwardly therefrom, and means carried by the upwardly extending members for raising and lowering the push beams and road implement carried thereby.

8. A machine of the character described including in combination with a tractor having track frames, push beams pivotally connected to the track frames, a road implement carried by the push beams, longitudinally spaced brackets connected to each of the track frames, one of said brackets including clamping plates adapted to be engaged with the track frame, members carried by the brackets and extending upwardly therefrom, and means carried by the upwardly extending members for raising and lowering the push beams and road implement carried thereby.

9. A machine of the character described including in combination with a tractor having track frames, push beams on opposite sides of the frames and having upright arms and pivotally connected to the track frames, a road implement carried by the push beams, a pair of cooperating and communicatively connected hydraulic rams each interposed between said track frames and said upright arms of the push beams respectively for raising and lowering the push beams by hydraulic pressure, and means for relieving the pressure of the hydraulic means when the road implement engages the ground.

10. A machine of the character described including in combination with a tractor having track frames, push beams pivotally connected to the track frames, a road implement connected to the outer ends of the push beams, a member extending between the push beams and connected to the inner faces thereof to the rear of the road implement, and a reinforcing member extending between and connected to the push beams between the road implement and the first mentioned member and connected to the road implement and first mentioned member.

11. A machine of the character described, including in combination with a tractor having track frames, side push beams pivotally connected to the track frames, a road implement carried by the push beams, and hydraulic means for pivotally raising and lowering the push beams, said hydraulic means including a pair of hydraulic cylinders and pistons operatively establishing hydraulic connection between each of said push beams and their corresponding track frames at points forward of the tractor axle, said pair of hydraulic cylinders being communicatively interconnected and with their associated pistons operatively functioning to permit movement of said track frames in going over uneven ground without affecting the position of the push beams and road implement relative to their horizontal side to side alignment with the tractor body.

12. A machine of the character described, including in combination with a tractor having track frames, side push beams pivotally attached to the track frames, a road implement carried by said push beams, and hydraulic means including a pair of transversely spaced hydraulic rams respectively establishing operative hydraulic connection between each of said push beams and their corresponding track frames, said connections being established at points forward of the tractor axle, and said pair of hydraulic rams being communicatively inter-connected and operatively functioning to permit said rams and the frames respectively connected therewith to move alternatively up or down or move together up or down, thus to permit movement of said track frames in going over uneven ground without affecting the position of the push beams and road implement relative to their horizontal side to side alignment with the tractor body.

13. A machine of the character described including in combination with a tractor having track frames, push beams pivotally connected to the track frames, a road implement carried by the push beams, and hydraulic means interposed between the track frames and push beams for raising and lowering the push beams, said hydraulic means operating to permit movement of the track frames in going over uneven ground without affecting the position of the push beams and road implement carried thereby relative to the tractor.

14. A machine of the character described including in combination with a tractor having track frames, push beams pivotally connected to the track frames at opposite sides of the tractor, a road implement carried by the push beams, and a hydraulic ram interposed between each of the track frames and a push beam, said hydraulic rams being operable to raise and lower the push beams and to permit independent movement of the track frames in going over uneven ground without affecting the position of the push beams and road implement carried thereby relative to the tractor.

15. A machine of the character described including in combination with a tractor having track frames, push beams pivotally connected to the track frames at opposite sides of the tractor, a road implement carried by the push beams, a hydraulic ram interposed between each of the track frames and a push beam, and fluid passages connecting the rams, said hydraulic rams being operable to raise and lower the push beams and with their connecting passages permitting independent movement of the track frames in going over uneven ground without affecting the position of the push beams and road implement carried thereby relative to the tractor.

16. A machine of the character described including in combination with a tractor having track frames, push beams pivotally connected to the track frames, a road implement carried by the push beams, members extending upwardly from the push beams, means connecting the upwardly extending members, and hydraulic means interposed between the track frames and upwardly extending members of the push beams, said hydraulic means operating to permit movement of the track frames in going over uneven ground without affecting the position of the push beams and road implement carried thereby relative to the tractor.

HARRY C. BUFFINGTON.